Figure 1A:
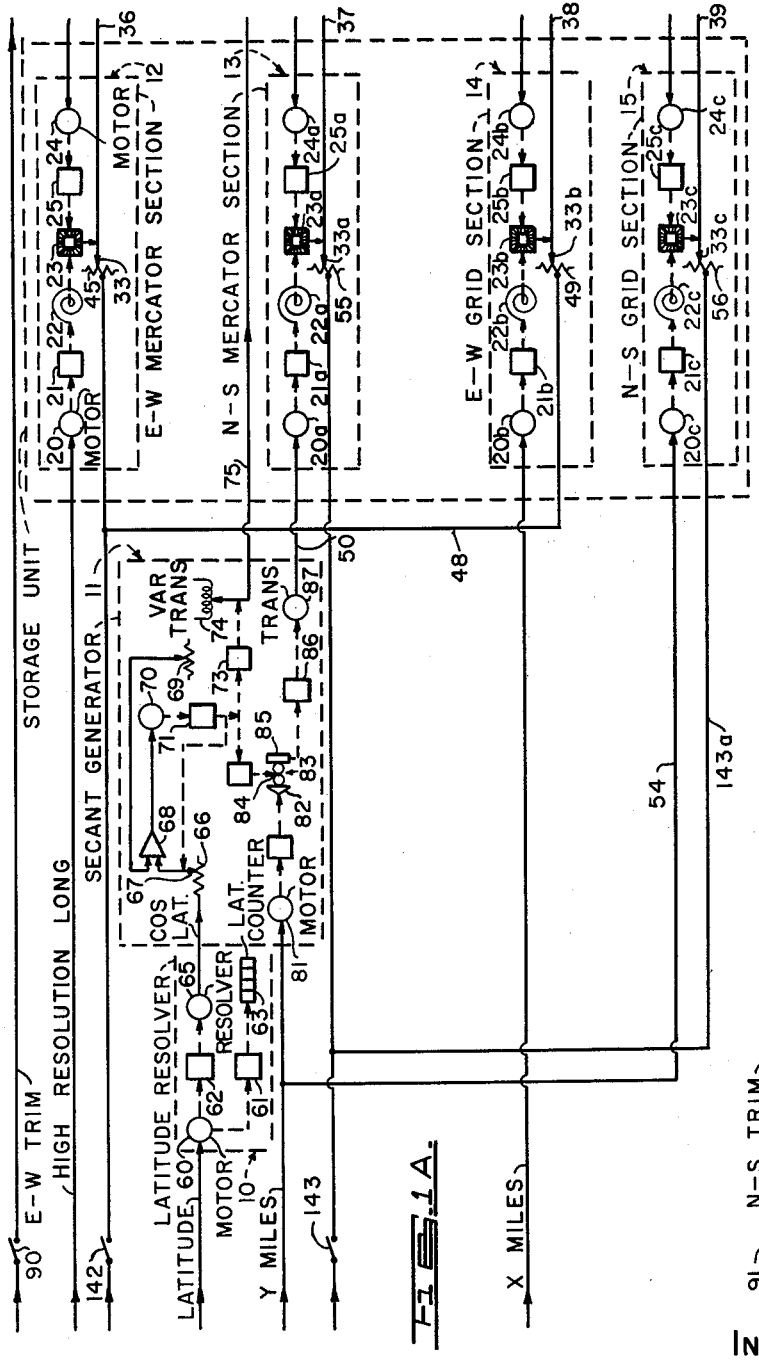

March 5, 1963

J. G. WRIGHT ETAL 3,080,117

TACTICAL COMPUTER

Filed Feb. 14, 1961

2 Sheets-Sheet 1

INVENTORS
JERAULD G. WRIGHT
HUGH W. WILSON

BY Smart & Biggar
ATTORNEYS

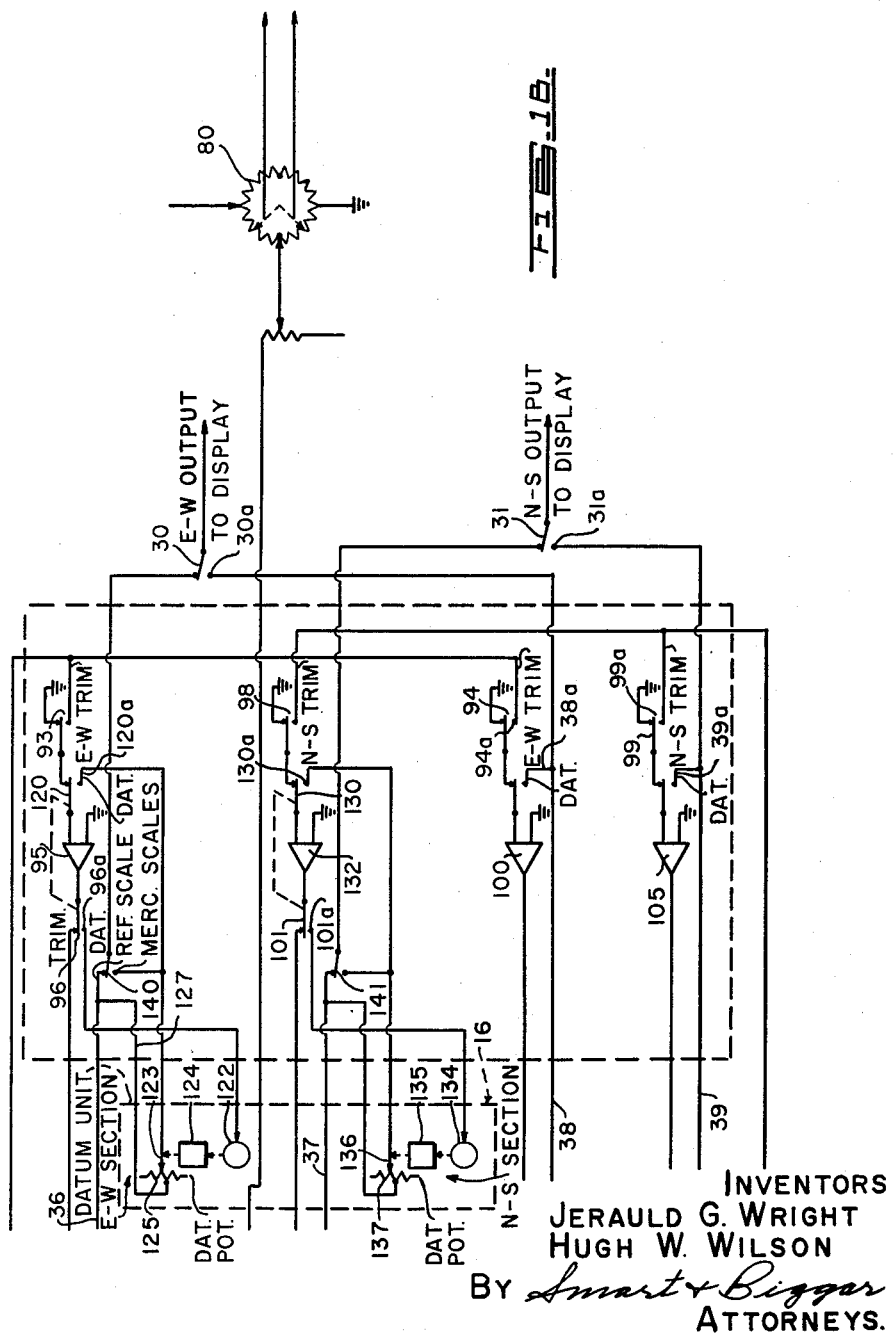

United States Patent Office 3,080,117
Patented Mar. 5, 1963

3,080,117
TACTICAL COMPUTER
Jerauld George Wright, Dartmouth, Nova Scotia, and Hugh W. Wilson, Osgoode, Ontario, Canada, assignors to Her Majesty the Queen in right of Canada as represented by the Minister of National Defence, Ottawa, Ontario, Canada
Filed Feb. 14, 1961, Ser. No. 89,148
Claims priority, application Canada Feb. 15, 1960
6 Claims. (Cl. 235—187)

This invention relates to a computer for use with an aircraft ground position indicator such as a projector which projector is adapted to move in response to control signals from the computer in Cartesian coordinates at right angles to each other in a plane parallel to a chart whereby to continuously display a representation of the aircraft ground position on the chart. A device which does this is described in the copending Wright et al. patent application Serial 792,520, now abandoned.

In the past aircraft ground position indicators have displayed on a chart the aircraft's position in grid coordinates. Where the distances to be covered by the aircraft are small these projectors have been relatively effective. However, where the aircraft is to fly great distances the prior devices are of little or no use since no compensation is made for the sphericity of the earth.

A further drawback of the devices of the prior art is that where chart scales are changed no provision is made for the transfer of a datum point from the original chart to another of different scale. It has been necessary in the past when changing scales of charts to set up the projector manually to the aircraft position for the new chart.

It is an object of the present invention to provide a computer for use with a ground position indicator projector which is capable of transmitting to the projector control signals which will selectively cause the projector to take the sphericity of the earth into account or to operate in grid coordinates. Furthermore to provide a computer which is capable of "remembering" a selected datum point whereby in transferring from one chart to another of different scale the selected datum may be set upon the new chart with the minimum of effort.

According to the present invention a computer comprises: storage means adapted to receive continuously, store and transmit analogue information of change of aircraft ground position in terms of longitude; storage means adapted to receive continuously, store and transmit analogue information of change in aircraft ground position in terms of latitude; storage means adapted to receive continuously, store and transmit analogue information of change in aircraft ground position in terms of a Cartesian grid coordinate; storage means adapted to receive continuously, store and transmit analogue information of change in aircraft ground position in terms of a Cartesian grid coordinate at right angles to said first mentioned Cartesian grid coordinate; and switch means adatped to select transmission of analogues of aircraft position either from the latitude storage means and the longitude storage means, or from the grid coordinates storage means and apply said selected analogues as control signals to the projector the reception and storage of the unselected analogue information being maintained.

The following is a description by way of example of one embodiment of the present invention with reference to the accompanying drawings in which:

FIGURES 1A and 1B together are a diagrammatic representation of the embodiment.

The device comprises four major units, a latitude resolver 10, a secant function generator 11, an analogue storage device comprising four storage units, an "East-West Mercator" unit 12, a "North-South Mercator" unit 13, an "East-West Grid" unit 14 and a "North-South Grid" unit 15, which are of identical construction, and a datum unit 16.

The major inputs to the device are analogues of change in longitude, change in latitude and analogues of Cartesian grid coordinates at right angles to each other of change in aircraft ground position, hereinafter designated "$x$ miles" and "$y$ miles." The outputs from the computer are analogue control signals to orient the projector in terms of "East-West miles" and "North-South miles" whereby to project a display of aircraft position selectively on to either a Mercator chart, or a grid chart.

The storage device acts primarily as a "storage" and also as a "memory" and each unit thereof comprises a step by step motor 20 which converts an electrical analogue input signal into a mechanical step by step transmission, gear box 21, a coil spring "mechanical memory" 22, and a differential device 23. The memory 22 is such that incoming analogue information is stored by tensioning the coil spring which, when required, uncoils to "read out" the stored information. The storage device also includes a trim or sluing motor 24 which converts an electrical analogue input into a mechanical transmission through gearing 25, to the differential 23. Like elements of the units 13, 14 and 15 have been given the same numerals as those alloted to the unit 12, but with the respective suffixes "$a$," "$b$" and "$c$."

Selector switches 30, 31 selects transmission of Mercator analogue control information or grid navigational control information to the projector.

Each of the differentials 23, 23$a$, 23$b$ and 23$c$ position a wiper 33, 33$a$, 33$b$ and 33$c$ respectively, which govern the value of the output analogue voltages on electrical conductors 36, 37, 38, 39 to the switches 30 and 31 to control the projector orientation.

The "East-West Mercator" storage unit 12 has an electrical input analogue on conductor 40 of a high resolution "change in longitude." This analogue information can be obtained from any suitable device, such as for example the dead reckoning computer described in the Wright et al. copending application Serial No. 792,520, now abondoned, filed Feb. 15, 1960. A second input to the storage unit 12 is that of an electrical analogue signal of the range from the aircraft to a selected target multiplied by the sine of the analogue of bearing to the target. This analogue signal is obtained from a resolver 80 (as hereinafter described). The analogue signal is applied to one side of the potentiometer 45, whose wiper 33 is positioned by the differential 23. This latter electrical analogue is also applied on electrical conductor 48 as an input to the "East-West Grid" storage unit 14 to one side of its potentiometer 49 whose wiper 33$b$ is positioned by the differential 23$b$. The second input to the storage unit 14 is an electrical analogue of "change in $x$ miles" from a suitable source, for example the computer described in application Serial No. 792,520, now abandoned, and is applied to the step by step motor 20$b$.

The input to the "North-South Mercator" storage unit 13 is in the form of an electrical analogue signal of "change in latitude" which is computed in the secant function generator 11 from an input thereto of the analogue of "change in $y$ miles" from a computer such as described in Canadian application No. 792,520, now abondoned and multiplied by the secant of latitude in generator 11 to be described hereinafter. Thus the input on electrical conductor 50 to the "North-South Grid" storage unit 15 is an electrical analogue of "change in $y$ miles multiplied by the secant of latitude," which analogue is equal to the analogue of "change in latitude." The "change in $y$ miles" input to the secant generator 11 is also conducted through conductor 54 and forms an input to the step by step motor 20c of the "North-South Grid" storage unit 15.

The second input to the "North-South Mercator" storage unit 13 is an electrical analogue signal of the cosine of the angle of bearing of the selected target to the aircraft multiplied by the range of that target. This analogue is obtained from a resolver as hereinafter to described and is applied to the potentiometer 55 whose wiper 33a is postioned by the differential 23a and this analogue also forms the second input to the "North-South Grid" storage unit 15 being applied to its potentiometer 56 whose wiper 33b is positioned by the differential 23c.

The latitude resolver 10 receives an electrical input analogue of "change in latitude" from a suitable computer, for example that described in the copending application Serial No. 792,520, now abandoned. The input analogue drives a step by step motor 60 which through gearing 61 positions latitude counter 63. The motor 60 also, through gearing 62, supplies a mechanical input to a resolver 65 from which an electrical analogue signal of cosine of the "change in latitude" is resolved and applied as input to a potentiometer 66. The take off from the potentiometer 66 is through its wiper 67 to an amplifier 68. An electrical signal from a ratio potentiometer 69 is applied to the amplifier 68 which drives a motor 70 so that the output of the motor 70 is the analogue of the secant of the "change in latitude." This secant function analogue from the motor 70 positions the wipers 67 of the potentiometer 66 through gearing 71 until the system is in balance. The motor 70 also through gearing 71 and gearing 73 operates a variable transformer 74 to transmit electrically on conductor 75 an electrical analogue of the secant function of "change in latitude." This electrical analogue supplies an excitation voltage for a resolver 80 in an instrument remote from the computer. The resolver 80 is of the type capable of accepting as inputs an analogue signal of range to a selected target and the analogue of the angle of bearing to that target and resolving the inputs into analogues of the sine of the angle of bearing to the target multiplied by the range thereto, and the cosine of the angle of bearing to the target multiplied by the range thereto. An instrument of this type is described in application Serial No. 792,520, now abandoned. The sine resolution is then applied to the potentiometer 45 of the storage unit 12 and to the potentiometer 49 of the storage unit 14. The cosine resolution is applied to the centre tape of potentiometers 55 and 56 of the storage units 13 and 15 respectively.

An input of the "change in y miles" coordinate component is applied to a step by step motor 81 which converts the analogue into mechanical form and rotates a disc 82 of a ball disc integrator 83. The ball carriage 84 of the integrator 83 is positioned by the secant function analogue output from the motor 70 and thus the roller 85 of the integrator 83 resolves the mechanical analogue of "change in y miles" multiplied by the secant of latitude (this is equal to "change in latitude"). This resolution is applied through gearing 86 to a step by step transmitter 87 where it is converted into electrical form and applied via conduct 50 to the step by step motor 20a of the "North-South Mercator" storage unit 13.

A pair of remote trimming or sluing switches 90 and 91 are provided to slue the projector to which the apparatus of the present invention is connected to a selected position, the sluing switch 90 operating "East-West Mercator" and "East-West Grid" trim switches 93, 94 and the sluing switch 91 operates "North-South Mercator" and "North-South Grid" trimming switches 98, 99. When the switch 93 is closed a sluing voltage is applied to the amplifier 95 which through switch 96 applies the sluing voltage to the motor 24 of the storage unit 12. The motor 24 operates through gear box 26 and differential 23 to position the wiper 33 of the potentiometer 45 whereby a sluing voltage is transmitted through a conductor 36 and switch 30 to position the projector. The switch 94 being closed to make contact 94a, the sluing voltage is applied through amplifier 100 to the motor 24b of storage unit 14 to bring the slider 33b of the potentiometer 49 whereby a sluing voltage is transmitted through a conductor 38 and switch 30a to position the projector. When the "North-South" sluing switch 91 is closed, switch 98 is closed and a sluing voltage is applied through switch 101 to the motor 24a of storage unit 13 which motor through gearing 25a and the differential 23a moves the wiper 33a of the potentiometer 55 to apply the sluing voltage to the conductor 37 and through switch 31 to slue the projector at right angles to the direction imparted to it through the switch 30. As before the closing of the switch 91 also closes switch 99 to make contact 90a and apply the sluing voltage through amplifier 105 to motor 24c of storage unit 15 to bring the slider 33c of the potentiometer 56 whereby a sluing voltage is transmitted through a conductor 39 to position the projector.

The datum unit 16 is a device whereby the operator can cause the computer to remember the coordinates of a selected datum point and to refer to it when necessary. This is achieved for the "East-West Mercator" section of the datum unit by closing the switch 96 against contact 96a, which also has the effect of closing the switch 120 against contact 120a. A closed servo loop is formed between the amplifier 95, the motor 122 and the potentiometer 123. The motor 122 thus drives the wiper 123 of potentiometer 125 through gear box 124 so that the instantaneous voltage on conductor 36, which is applied to the potentiometer 125 through conductor 127, is balanced. On releasing thru a time delay the datum switches 96 and 120 the wiper 123 has been positioned on the potentiometer 125 to "remember" a voltage analogous to the longitude of a selected datum.

Similarly with the "North-South" section section of the datum unit 16 when the datum switches 101 and 130 are operated to make contact 101a and to make contact 130a the amplifier 132 is caused to emit a signal energizing motor 134 to position, through gearing 135, the wiper 136 of potentiometer 137 to balance the instantaneous volage on the conductor 37. The "North-South Mercator" section of the datum unit 16 is thus caused to remember by the position of the wiper 136, of potentiometer 137 the latitude analogue of the selected datum point.

For normal routine navigation Mercator charts will be used and at the commencement of a flight the navigator, by operating the trim or sluing switches 90, 91 will cause the projector to display the aircraft representation at his initial point of flight on the chart. On releasing the trim switches 90 and 91 and closing the switches 30 and 31 to make contact as shown in the drawings the projector control outputs at switches 30 and 31 will be analogues of "change in longitude" and "change in latitude," thus the projected aircraft representation will follow the flight path of the aircraft over the chart. The inputs of "x" and "y" miles to storage units 14 and 15 are of course maintained and are stored in the potentiometer 49, 56.

Let it be supposed that the aircraft is conducting a maritime military flight which requires a rendezvous with a convoy and thereafter an antisubmarine search. As the aircraft makes its rendezvous with the convoy the navigator pushes the datum point setting switches 96, 101 and the instantaneous latitude and longitude of the convoy is stored in the datum unit 16. It may then be decided to conduct a patrol on a larger scale of map, and the navigator having selected the convoy position as datum then selects a larger scale chart which has a centre the latitude and longitude bands of the stored datum point. It is unlikely that a chart is available which has the precise latitude and longitude of the datum point as centre, and the displacement of the datum point from the chart centre may be, before changing the scales, set into the resolver 80 in terms of range and bearing from the datum point to the intersection of the centre latitude and longitude bands of the selected chart. This displacement is noted and the switches 142, 143, 96 and 110 operated to move the potentiometer wipers 123, 136 of the datum unit 16 by the amount necessary to compensate for this displacement. When the chart of new scale has been positioned the excitation voltage for the device of the present invention and for the positioning motors for the projector is selected to correspond with the selected scale and thus the display on the new map will show the compensated datum point as the centre of the presentation. By removing the analogue signal from the resolver 80 by opening switches 142, 143, the original datum set will be "remembered" by the datum unit 16.

Let it be assumed that during the course of the search using the larger scale map the existence of some object is detected. An input of the analogues of range and bearing to that object to be investigated is applied to resolver 80 and thence through switches 142, 143 to the potentiometers 45 and 55 of the storage units 12 and 13. By closing switching 142, 143 the navigator adds the analogue of range multiplied by the sine of the angle of bearing to the longitude output on conductor 36 and the analogue of the range multiplied by the cosine of the bearing to the latitude output of the conductor 37. This causes the projected aircraft representation to be displaced by the range and bearing to the object from the aircraft on the chart thus enabling the navigator to plot the position of the object on his chart and then release switches 142, 143 to return the projector to the normal latitude and longitude outputs on conductors 38, 36. The navigator may now choose to operate on a grid chart rather than a Mercator chart. For this purpose the sluing switches 90 and 91 may be operated to pose the projection of the image the centre of the grid chart and switches 30 and 31 are moved to make contacts 30a and 31a to select the analogue control information from grid storage units 14 and 15. The display of the aircraft will now be in a straight forward "x" and "y" miles, no allowance being made for the secant relationship between "y" and "x" miles as for a Mercator chart. Information to motors 20 and 20a of the Mecator storage units 12 and 13 is however continued and the potentiometer 45, 55 of the storage units act to store the input analogue information whilst the aircraft is flying on a grid navigation system.

At different observation positions throughout the aircraft operators are provided with a "hold" button which is electrically connected with brakes (not shown) on the differentials 23, 23a, 23b, 23c. If at any time during the course of the patrol an observation is made by one of the aircraft crew men of an object which he feels should be marked on the chart, he may, by operating his "hold" button apply the brakes to the differentials and "freeze" the display. A warning light is, at the same time, lit at the navigator's station to show that the display is "frozen." By the intercommunication system the navigator is informed as to the nature of the object, which may be, for example, a well known land mark. Whilst the device is in the "hold" condition the memory devices 22, 22a, 22b and 22c store the incoming information and the navigator alone may release the device from the "hold" condition. On releasing of the brakes for the differentials, depending upon whether the aircraft is operating on Mercator or grid scales, the storage units 12 or 13 or the storage units 14 and 15 will read out the information stored in their memory devices thus causing the display on the chart to "catch up" with the present position of the aircraft.

The term "Cartesian coordinates" as used herein and hereinafter in the claims is intended to cover both right angular grid coordinates of linear relationship and right angular grid coordinates of Mercator relationship.

What we claim as our invention is:

1. An aircraft ground position indicator computor for use with a projector for displaying the aircraft position on a chart which projector is adapted to move in response to control signals from the computor in Cartesian coordinates at right angles to each other in a plane parallel to a chart, which computer comprises: a storage means adapted to receive continuously, store and transmit analogue information of change of aircraft ground position in terms of longitude; storage means adapted to receive continuously, store and transmit analogue information of change in aircraft ground position in terms of latitude; storage means adapted to receive continuously, store and transmit analogue information of change in aircraft ground position in terms of a Cartesian grid coordinate; storage means adapted to receive continuously, store and transmit analogue information of change in aircraft ground position in terms of a Cartesian grid coordinate at right angles to said first mentioned Cartesian grid coordinate; switch means adapted to select transmission of analogues of aircraft position either from the latitude storage means and the longitude storage means, or from the grid coordinates storage means and apply said selected analogues as control signals to the projector, the reception and storage of the unselected analogue information being maintained; the latitude storage means, the longitude storage means and the grid coordinates storage means, each comprising a step by step motor arranged to continuously receive the input of relevant analogue information, mechanical memory means, and mechanical connections between said motor and said memory means, adapted to transmit the analogue information received by said motor in mechanical form to said memory, a mechanical output means from said memory, conversion means adapted to convert the output analogue information from said memory to electrical form; and electrical conductor means from said conversion means to said switch means for conducting output analogue information from said storage means as control signals for said projector.

2. Apparatus as claimed in claim 1 in which said conversion means comprises a potentiometer and electro-servo mechanical means adapted to position the wiper of said potentiometer means in response to the output analogue information from said memory.

3. Apparatus as claimed in claim 1 in which a datum information storage unit is provided comprising: potentiometer means electrically connected to said conductor means from said longitude storage means; potentiometer means electrically connected to said conductor means from said latitude storage means; servo means for positioning a wiper of the potentiometer means associated with the longitude storing means; servo means for positioning a wiper of the potentiometer means associated with the latitude storage means; and switch means adapted on operation to actuate each of said servo means to drive said wipers to balance the instantaneous analogue information on their respective potentiometer means and on release to cause said wipers to maintain their new position whereby to permit of the storage of a datum position in terms of the analogues of latitude and longitude.

4. Apparatus as claimed in claim 1 in which latitude resolving means is provided comprising a step by step motor adapted to receive electrical analogue information in respect of the component of distance travelled by the aircraft in relation to North-South extending Cartesian grid coordinates; integrator means adapted to receive as a mechanical analogue the electrical analogue input to said step by step motor; means for setting into said integrator an analogue function of secant of the aircraft's latitude position, whereby to cause said integrator to transmit the analogue of the integral of its inputs as the input analogue of "change in latitude" to the latitude storage means.

5. Apparatus as claimed in claim 1 in which the means for applying an input of the analogue of secant of latitude to said integrator comprises; resolving means adapted to receive the analogue input of latitude and to resolve and transmit the cosine of that latitude; means adapted to receive and invert this last mentioned analogue and transmit the inverted analogue to said integrator, whereby to provide an input analogue of secant of latitude therefor.

6. Apparatus as claimed in claim 1 in which said mechanical means to position the wiper of said potentiometer means comprises: a differential adapted to receive as a first input the analogue information from said mechanical memory means, and in which switch means is provided to apply a sluing signal to a motor to generate a compatable analogue as a second input to said differential whereby to cause said differential to position said wiper of said potentiometer means in accordance with said sluing signal thereby sluing said projector to the position selected.

References Cited in the file of this patent
UNITED STATES PATENTS
2,926,331   Lindsey _____ Feb. 23, 1960

OTHER REFERENCES

"Error Detection and Location" (IBM Technical Disclosure Bulletin—L. C. Highby, Jr.), vol. 1, No. 4, p. 17; December 1958.

"Univac" (Remington Rand), May 16, 1958, page 12 relied on.